J. H. KLENCK.
AUTOMATIC ACETYLENE GENERATOR.
APPLICATION FILED JAN. 7, 1913.
1,114,772.
Patented Oct. 27, 1914.
2 SHEETS—SHEET 2.
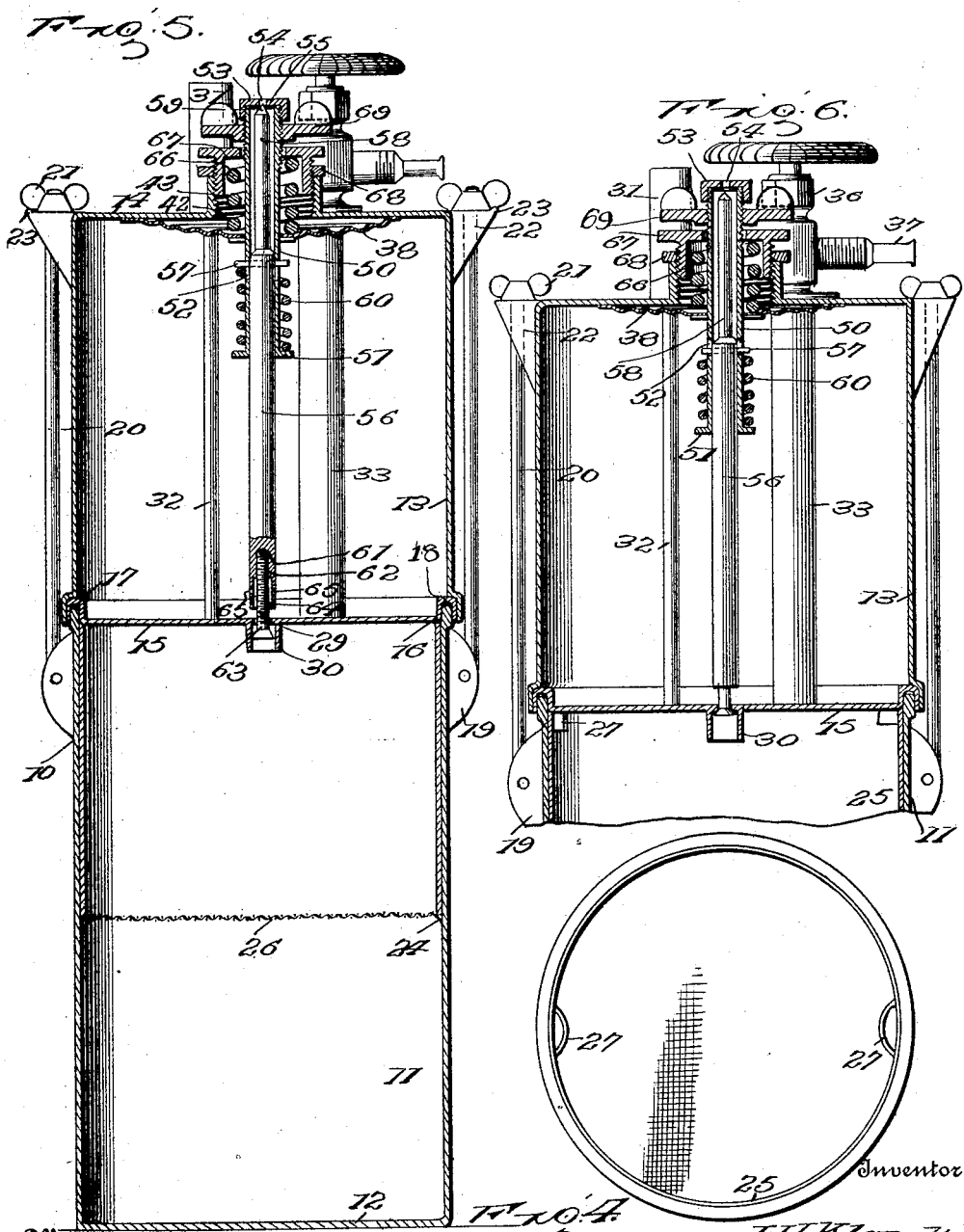

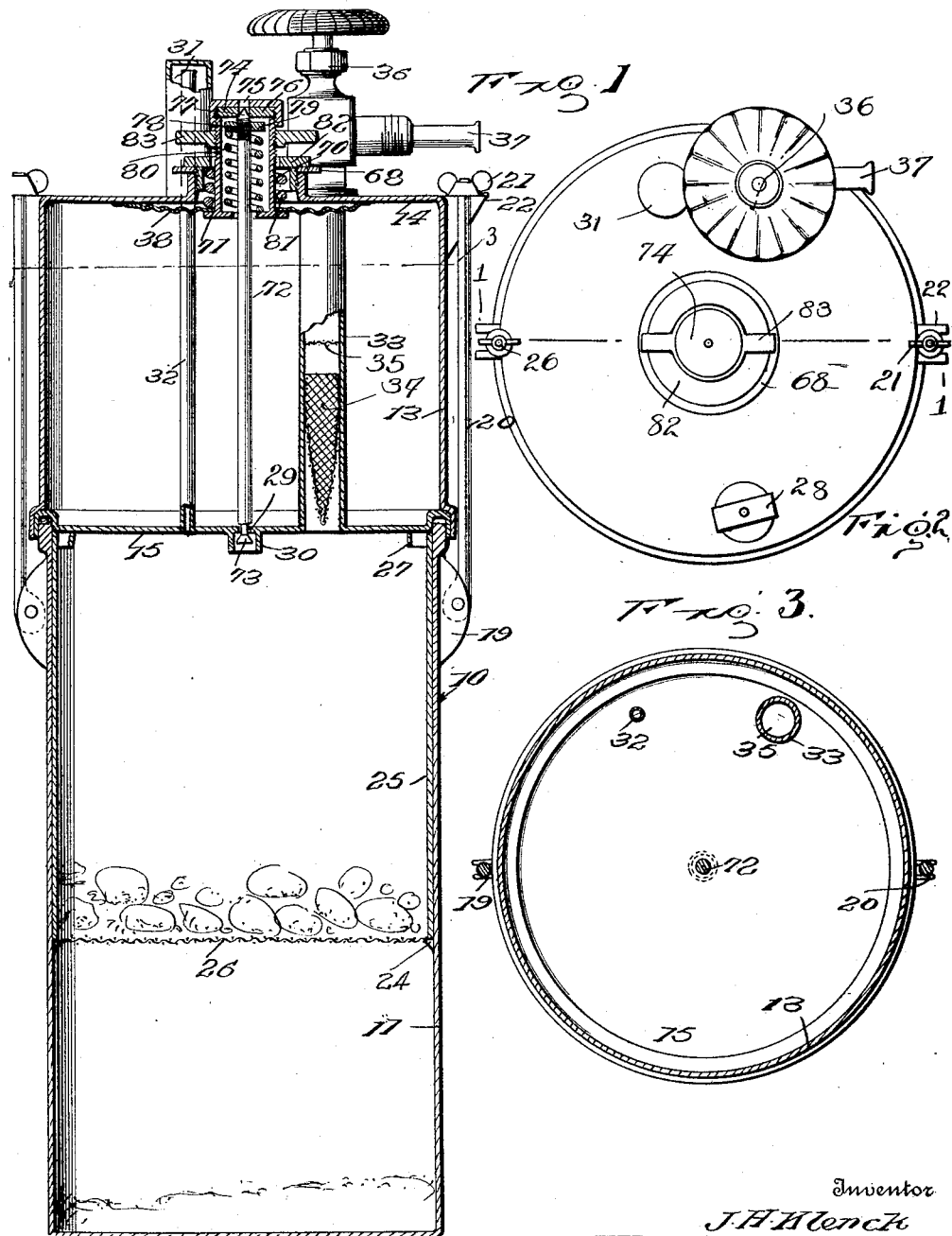

UNITED STATES PATENT OFFICE.

JOHN H. KLENCK, OF WARREN, PENNSYLVANIA.

AUTOMATIC ACETYLENE-GENERATOR.

1,114,772.  Specification of Letters Patent.  Patented Oct. 27, 1914.

Application filed January 7, 1913. Serial No. 740,632.

*To all whom it may concern:*

Be it known that I, JOHN H. KLENCK, a citizen of the United States, residing at Warren, in the county of Warren and State of Pennsylvania, have invented certain new and useful Improvements in Automatic Acetylene-Gas Generators, of which the following is a specification.

My invention relates to new and useful improvements in gas generators and more particularly in acetylene gas generators and the object of my invention is to provide a generator particularly adapted for use upon automobiles, motorcycles and other self-propelled vehicles.

A further object of my invention is to provide a generator in which the gas is generated at or very nearly at atmospheric pressure or any higher predetermined pressure within reasonable limits and in which the gas pressure is maintained at a certain point without any perceptible variation, whether the gas in the generator is being used or not, this being accomplished by an automatic regulation of the valve controlling the flow of water to the carbid.

A further object of my invention is to automatically govern the opening and closing of this valve by the gas pressure within the generator, thus doing away with the unequal generation of gas in vehicle carried generators, due to the passage of the vehicle at times over smooth roads and at other times over rough roads and in which the generation of gas is controlled wholly by settings of the water valve, as it is impossible to set the water valve to uniformly generate gas under varying conditions.

A further object of my invention is to provide a generator in which the gas is always under slight pressure and in which therefore a rapid generation of a small amount of gas caused by the action of a drop of water falling upon the carbid, will not have any appreciable effect upon the lights because of its expansion, thus dispensing with the necessity of wicks, distributers, gas bags and the like commonly employed to prevent flickering of the lamps. And a still further object of my invention is to so construct the generator that the pressure operated, valve controlling mechanism, may be readily adjusted in such a manner as to permit the generation of gas at any desired pressure. One of the chief advantages of this latter construction is that if the burners of the lamps become clogged, gas may be generated under relatively high pressure and then admitted to the burner tubes to blow the foreign matter from the burners and clean the same.

With these and other objects in view, my invention will be more fully described, illustrated in the accompanying drawings, and then specifically pointed out in the claims which are attached to and form a part of this application.

In the drawings: Figure 1 is a central vertical sectional view of my improved acetylene gas generator, the section being taken on the line 1—1 of Fig. 2; Fig. 2 is a top plan view of the generator; Fig. 3 is a transverse sectional view on the line 3—3 of Fig. 1; Fig. 4 is a top plan view of the carbid holding portion of the generator, the water reservoir, together with the pressure controlled valve mechanism, being removed; Fig. 5 is a sectional view similar to that shown in Fig. 1, but illustrating a modified form of construction including an automatic safety valve for relieving the pressure in the generator when it becomes too great, the water supply valve being shown in open position and the safety valve in closed position; Fig. 6 is a fragmentary sectional view similar to that shown in Fig. 5, but with the water valve closed and the safety valve open.

Corresponding and like parts are referred to in the following description and indicated in all the views of the drawings by the same reference characters.

The preferred embodiment of my gas generator, as a whole, consists of a cylindrical body member 10 including a lower body member 11 closed at its lower end as shown at 12 and forming the carbid receptacle and an upper body member 13 closed at its upper and lower ends as shown at 14 and 15 and forming the water reservoir of the generator. In constructing the body members 11 and 13, said members are each preferably spun or otherwise formed in a single piece, the bottom 15 of the member 13 being afterward brazed or soldered in place. The free edge portion of the body member 11 is thickened or braced as shown at 16, while the outer edge of the bottom is stamped, drawn or otherwise formed to provide a groove or channel 17 in which is seated a packing ring 18 to insure a close and gas tight joint between the members 11 and 13 when placed in superimposed position as shown in Fig. 1.

The body member 11 is provided adjacent its upper end with pairs of diametrically located, perforated ears 19 between which are pivoted bolts 20, the free ends of which are screw threaded for engagement by winged nuts 21. The body member 13 of the generator is provided at its upper end with similarly disposed ears 22, the upper edges of which lie in the plane of the top of said body member and the free ends of which are directed upwardly slightly as shown at 23.

In assembling the body members 11 and 13, the member 13 is positioned upon the member 11 and the bolts 20 swung to seat between the ears 22 when the winged nuts 21 are tightened to firmly clamp the members together, the upwardly directed terminals 23 of the ears 22 serving to absolutely lock the bolts 20 against outward swinging when the nuts are once turned home.

The body member 11 is provided intermediate its length with an interiorly formed annular rib or shoulder 24 forming a seat for the carbid holder proper 25. This carbid holder includes a cylindrical sleeve or shell closed at its lower end by a foraminous screen 26, preferably formed integral with the sleeve which seats by its lower end upon the rib or shoulder 24 and extends with its upper edge spaced somewhat below the upper end of the body member 11. At the upper end of the shell are diametrically disposed inwardly directed handles 27 by means of which the carbid receptacle may be removed from the lower body member of the generator. By spacing the lower end of the carbid receptacle proper above the bottom 12 of the generator, I provide a space below the receptacle for the ashes or spent carbid which, because of the vibration of the generator when used upon motor vehicles, will sift through the screen 26, nothing but fresh carbid being presented to the flow of water from the reservoir as will be hereinafter explained.

The top 14 of the generator is provided at one side with a filling opening normally closed by a plug cap 28 and the bottom 15 of the water reservoir is provided centrally with an outlet port 29 through which water may pass to the carbid, this port being surrounded by a downwardly depending annular flange 30 to protect the same from spattering carbid through the gas generation. The valve by means of which the flow of water through this port is controlled and the automatic mechanism for controlling the valve will be later fully explained.

Extending upwardly from the top 14 of the generator and at one side thereof, is a cylindrical shell 31 closed at its upper end and communicating directly with the water reservoir at its lower end and a pipe 32 having a relatively small bore extends at one end through the bottom 15 of the water reservoir and at its other end into the shell 31, terminating a short distance below the top thereof, as clearly shown in Fig. 1 of the drawings. This pipe and shell 31 provide means for the passage of the generated gas from the lower portion of the generator to the space in the water reservoir above the water therein and also prevent any danger of leakage of water into the carbid receptacle as the extending of the pipe into the shell above the top of the generator prevents all splashing of water into the upper end of the pipe. A second pipe 33 of relatively large diameter extends vertically through the body portion 11 of the generator communicating by its lower end with the carbid chamber when the generator is assembled and with its upper end opening through the top 14. Positioned within the lower portion of this pipe 33, is a conical screen of foraminous material 34 and immediately above this a transversely extending screen 35, these screens serving to remove minute impurities from the generated gas before its passage to the lamp burners. Threaded into the upper end of the tube 33, is an outlet valve 36 of the usual or any preferred type for controlling the flow of gas from the generator, this valve being provided with a nipple 37 for connection with the supply pipe or hose, not shown.

The above is a description of the general construction of the generator body proper and this construction is common to both forms of generators illustrated in the drawings, the differences in construction between the different generators there shown consisting in the various means provided for controlling the water valve and in the types of safety valves for limiting the pressure in the generator.

The form of valve construction, illustrated in Figs. 5 and 6 of the drawings, includes a resilient metal diaphragm 38 brazed or otherwise secured by its edge to the inner face of the top 14 of the generator. The top 14 of the generator is provided with a central opening 42 about which extends an upwardly directed, internally threaded annular flange 43.

The diaphragm 38 carries a sleeve 50 provided at its lower end with an annular flange 51 and intermediate its length with diametrically disposed, longitudinally extending slots 52. The upper end of this sleeve extends considerably above the threaded collar or flange 43 and is externally threaded to receive a cap 53 provided with a central perforation 54 and carrying a packing disk 55 also provided with an opening registering in the opening 54. A valve stem 56 extends through this sleeve, being supported therein by diametrically extending pins 57 which pass through the slots 52 of the sleeve, the portion of the valve stem above these pins being reduced as shown at 58 and the upper end of the valve stem being formed with a conical terminal 59 seating in the valve seat formed by the openings in the cap and packing disk 55, the valve stem being normally held in this position by a coiled spring 60 surrounding the sleeve 50 and bearing between the flange 51 thereof and the pins 57. The lower end of the valve stem 56 is provided with a centrally formed threaded bore 61 to receive the threaded shank 62 of a valve 63 and the outer end of the bore 61 is counterbored at 64 to provide an annular chamber about the valve shank, water being admitted to this chamber by radially extending bores 65, this construction insuring a supply of water through the port 29 when the valve is opened, even although the valve be so widely opened that the lower end of the sleeve would seat upon the upper face of the bottom 15 of the water reservoir. The valve proper seats against the lower face of the bottom 15 and in fully open position, the stem seats on the bottom 15 to protect the valve mechanism from injury should the upper end of the stem be struck. A relatively heavy coiled spring 66 is held in place upon the diaphragm and about the sleeve and properly tensioned by a cap 67 having a set nut 68, the sleeve being movable through the cap. A winged collar 69 is threaded upon the upper end of the sleeve 50 below the cap 53 and may be turned to raise the sleeve through engagement with the cap 67, although its normal function is to limit downward movement of the sleeve. The collar 69, cap 67 and spring 66 are so adjusted that gas will be generated at the normal pressure and this adjustment is not to be broken unless gas at a different pressure is desired.

When the generator above described and illustrated in Figs. 5 and 6 of the drawings, is not in use, the collar 69 is turned down against the cap 67 to raise the sleeve 50 and consequently the valve stem 56, the latter being held in raised position with respect to the sleeve by the spring 60, to maintain the valve 63 in closed position. When gas is to be generated, the collar 69 is loosened and the cap 67 turned down to compress the spring 66 and force the diaphragm 38 downwardly. Inasmuch as this diaphragm is connected to the sleeve 50 and inasmuch as the cap 53 carried by the upper end of this sleeve engages against the upper end of the valve stem 56, the downward movement of the diaphragm will open the valve. The gas generated in the carbid receptacle is free to expand and occupy all the space within the generator not taken up by the carbid and water, a portion of this gas passing through the pipe 32 and into the water reservoir above the water, the pressure in both portions of the generator being therefore equal. As soon as this pressure becomes too great, due either to a too rapid feeding of the water to the carbid or to the fact that no gas is being used, the pressure in the water reservoir will force the diaphragm 38 upwardly to raise the sleeve and, because of the spring 60 engaging between the flange 51 of the sleeve and pins 57 of the valve stem, to raise the valve and close the same. As soon as gas has been drawn from the generator in sufficient quantities to lower the pressure below normal, the spring 66 will immediately move the valve to open position again and admit more water to the generator. If for any reason, the gas pressure continues to increase after the closing of the valve, the diaphragm will be further raised and as the valve stem cannot move higher, due to the engagement of the valve 63, in its seat, it will be apparent that the cap 53 carried by the upper end of the sleeve will be moved away from the terminal 59 of the valve stem, which in effect forms a second valve, to permit the escape of gas through the opening 54. As soon as sufficient gas has escaped in this manner, to reduce the pressure to normal, the spring 60 will immediately force the sleeve back and close the safety valve. It will be apparent that with this construction, the spring 60 may be so proportioned as to permit the opening of the safety valve only when pressure in the generator becomes dangerous and that all other variations in pressure may be governed by a suitable adjusting of the cap 67 the same as with the generator shown in Figs. 1 to 3 of the drawings. In other words, the safety valve is intended merely as a device for rendering the generator absolutely safe and fool proof. It will therefore be apparent that the supply of water from the reservoir to the carbid is entirely automatic, being governed absolutely by the pressure of the gas generated and that gas will therefore be generated only as it is needed for use.

Gas may be generated at any desired pressure in the generator above described, by a proper adjustment of the cap 67 to suitably tension the spring 66 as the more this spring is compressed the greater will be the pressure in the generator necessary to close the valve 63.

In Fig. 1 I have illustrated my preferred form of generator in which the diaphragm 38 carries a sleeve 70 which extends upwardly through the top of the generator and which is externally threaded as shown. The lower end of this sleeve is provided with an outwardly directed flange 71 to which the diaphragm is attached and is closed with the exception of an opening for the passage of the valve stem 72 and also for the passage of gas, the lower end of which carries a valve 73 similar to the valve 63 and similarly mounted. Threaded upon the upper end of the sleeve 70, is the safety valve cap 74 perforated at 75 and carrying a perforated packing disk 76, these parts being identical in construction with the parts 53, 54 and 55 of the device shown in Figs. 5 and 6 and co-acting with the conical valve terminal 77 of the valve stem 72. The upper end of the valve stem 72 is threaded as shown at 78 to receive an adjusting nut 79 and surrounding the valve stem and bearing by one end against the closed end of the sleeve 70 and by its other end against the nut 79, is a coiled spring 80. A second and relatively heavy coiled spring 81 is positioned about the sleeve 70 bearing by one end against the diaphragm and by its other end against an adjusting cap 82 similar to the cap 67 previously described. A winged collar 83, threaded upon the sleeve 70, takes the place of the collar 69 of the structure shown in Fig. 5. With this form of construction the valves 73 and 77 are both normally closed. When gas is to be generated the cap 82 is threaded down to compress the spring 81 and so move the diaphragm 38 downwardly, this movement of the diaphragm acting through the sleeve 70 and its cap 74 to force the valve stem 72 down and open the valve 73, the safety valve 77, in the meantime, remaining closed. When sufficient gas has been generated its pressure in the upper part of the generator will force the diaphragm 38 upwardly to close the valve 73, the valve 77 still remaining closed because of the pressure of the spring 80. If, however, the pressure in the generator becomes too great, the diaphragm 38 will be forced upwardly still farther to further raise the sleeve against the tension of both the springs 81 and 80, as the valve stem 72 cannot move up and to thus open the valve 77 and permit the escape of excess gas. After the generator has been adjusted to generate gas at the desired pressure, the adjustment of the cap 82 and spring 81 is not to be changed unless it is desired to change the pressure at which the gas is to be generated.

From the foregoing description it will be apparent that I have provided an acetylene gas generator which when once started is entirely automatic in its action and which will constantly maintain a supply of gas at any desired pressure, within the limits of its capacity, irrespective of whether any gas is being drawn from the generator or not. Because of this, the generator is far more economical in use as there is practically no waste of gas and therefore no waste of carbid. It is furthermore useful because of the fact that a supply of gas may be always kept in the generator and the lamps lighted at any time, whereas with other generators now in common use, it is necessary to start the generator and generate a certain amount of gas before the lamps can be lighted.

It will of course be understood that I do not wish in any way to limit myself to the specific details of construction as shown in the various figures of the drawings and described in the specification as changes in their details of construction or in the arrangement of parts, may be made at any time, if desired, without in the slightest degree departing from the spirit of my invention.

Having thus described the invention, what is claimed as new is:

1. A gas generator including a carbid chamber, a liquid chamber, means for supplying liquid from the liquid chamber to the carbid chamber, means for supplying gas from the carbid chamber to the liquid chamber, means including a diaphragm operable by the pressure of the gas in the liquid chamber for governing the supply of liquid to the carbid chamber, and a safety valve operable by the diaphragm to permit the escape of gas from the liquid chamber if the pressure in the latter becomes abnormal.

2. A gas generator including a carbid chamber open at its upper end, a closed liquid chamber imposed upon the carbid chamber and forming a closure therefor, and bottom of said liquid chamber being provided with an opening, a diaphragm secured to the top of the liquid chamber, a sleeve secured to the diaphragm, a valve stem yieldably supported by the sleeve and carrying a valve adapted to close the opening in the bottom, means for exerting downward pressure upon the diaphragm, and means for drawing said sleeve upwardly.

3. A gas generator including a carbid chamber open at its upper end, a closed liquid chamber imposed upon the carbid chamber and closing the same, the bottom of the liquid chamber being provided with an opening, a diaphragm secured to the top of the liquid chamber, a sleeve carried by the diaphragm and movable therewith, a valve stem yieldably supported by the sleeve and carrying a valve for closing the opening in the bottom of the liquid chamber, said valve stem being free for limited movement independent of the sleeve, means for exerting downward pressure upon the diaphragm, and means operable to force the diaphragm and sleeve upwardly against said pressure to close the valve, said means being operable to further force the sleeve upwardly, the valve remaining closed.

4. A gas generator including a carbid chamber, a closed liquid chamber imposed upon the carbid chamber, means for supplying gas from the carbid to the liquid chamber, means for supplying liquid from the liquid chamber to the carbid chamber, said means including a valve stem provided at each end with a valve, one end of said stem extending through the top of the liquid chamber and the other end of said stem extending near the bottom thereof, a sleeve closed at its upper end to provide a valve seat for the adjacent valve, said sleeve being supported by the valve stem, but free for slight independent movement, a diaphragm secured to the top of the liquid chamber and to the sleeve, and means for adjustably exerting downward pressure upon the diaphragm to hold the sleeve and valves in lowered position.

5. A gas generator including a carbid chamber, a liquid chamber mounted upon the carbid chamber and having a top and bottom provided with openings, a threaded collar surrounding the opening in the top, a diaphragm secured to the top and extending over the opening therein, a sleeve partially closed at its lower end carried by the diaphragm and extending through the top, a valve stem provided at each end with a valve, one of said valves co-acting with the opening in the bottom, a cap threaded upon the upper end of the sleeve and co-acting with the valve at the other end of the stem, said cap being provided with an outlet port, a second cap engaging loosely about the sleeve and having threaded engagement with the collar, a coiled spring positioned between the second cap and diaphragm, a locking collar threaded upon the sleeve, a nut adjustably threaded upon the upper portion of the valve stem, and a coiled spring bearing between said nut, and the partially closed lower end of the sleeve.

In testimony whereof I affix my signature in presence of two witnesses.

JOHN H. KLENCK. [L. S.]

Witnesses:
R. L. KLENCK,
D. G. BLACKMAN.

Copies of this patent may be obtained for five cents each, by addressing the "Commissioner of Patents, Washington, D. C."